(12) United States Patent
Harouche

(10) Patent No.: US 8,814,483 B2
(45) Date of Patent: Aug. 26, 2014

(54) TWIST DRILL

(75) Inventor: David Ben Harouche, Nahariya (IL)

(73) Assignee: Iscar, Ltd., Tefen (IL)

( * ) Notice: Subject to any disclaimer, the term of this patent is extended or adjusted under 35 U.S.C. 154(b) by 953 days.

(21) Appl. No.: 12/897,403

(22) Filed: Oct. 4, 2010

(65) Prior Publication Data

US 2011/0085868 A1 Apr. 14, 2011

(30) Foreign Application Priority Data

Oct. 13, 2009 (IL) .......................................... 201486

(51) Int. Cl.
*B23B 51/00* (2006.01)
*B23B 51/02* (2006.01)

(52) U.S. Cl.
CPC ............. *B23B 51/02* (2013.01); *B23B 2251/18* (2013.01); *B23B 2251/14* (2013.01); *B23B 2251/202* (2013.01); *B23B 2251/082* (2013.01)
USPC .......................................... 408/223; 408/230

(58) Field of Classification Search
CPC .............. B23B 51/02; B23B 2251/082; B23B 2251/202
USPC .................... 408/223, 224, 227, 230
See application file for complete search history.

(56) References Cited

U.S. PATENT DOCUMENTS

| | | | |
|---|---|---|---|
| 5,273,380 A | 12/1993 | Musacchia | |
| 5,931,615 A * | 8/1999 | Wiker | 408/230 |
| 6,071,046 A | 6/2000 | Hecht et al. | |
| 6,443,674 B1 | 9/2002 | Jaconi | |
| 6,446,741 B1 | 9/2002 | Kersten et al. | |
| 6,988,859 B2 | 1/2006 | Borschert et al. | |
| 2006/0269372 A1 * | 11/2006 | Goshima | 408/230 |
| 2009/0317202 A1 | 12/2009 | Zhu | |
| 2010/0260567 A1 | 10/2010 | Kauper | |

FOREIGN PATENT DOCUMENTS

| | | |
|---|---|---|
| CN | 2663065 | 12/2004 |
| DE | 10 2008 049509 | 3/2010 |
| EP | 0 137 898 | 4/1985 |
| JP | 02311211 A * | 12/1990 |
| JP | 2006-231430 | 9/2006 |
| KR | 2006060829 A * | 6/2006 |
| WO | WO 2004082874 A1 * | 9/2004 |

OTHER PUBLICATIONS

English translation of abstract of JP02311211.*
English translation of KR2006060829.*

(Continued)

*Primary Examiner* — Andrea Wellington
*Assistant Examiner* — Alan Snyder
(74) *Attorney, Agent, or Firm* — Womble Carlyle

(57) ABSTRACT

A twist drill includes a cutting portion and a drill body. The cutting portion has a chisel edge, a segment relief surface, a chamfer relief surface and at least two flutes extending longitudinally to the drill body. Each flute has a rake surface and a gash extending away from the chisel edge. The cutting portion further has at least two cutting segments, each cutting segment having a first curved cutting edge, a second curved cutting edge and a chamfer cutting edge.

17 Claims, 3 Drawing Sheets

(56) References Cited

OTHER PUBLICATIONS

English translation of WO2004082874.*
Official Action dated Sep. 27, 2013 issued in Chinese counterpart application (No. 201080046024.0).
English Translation of Official Action dated Sep. 27, 2013 issued in Chinese counterpart application (No. 201080046024.0).
International Search Report in PCT/IL2010/000767, dated Jan. 17, 2011.
Official Action dated May 7, 2014 issued in Chinese counterpart application (No. 201080046024.0) with translation.
Official Action dated Apr. 15, 2014 issued in Japanese counterpart application (No. 2012-533735) with translation.

* cited by examiner

TWIST DRILL

FIELD OF THE INVENTION

The present invention relates to twist drills having shaped cutting edges.

BACKGROUND OF THE INVENTION

Self centering of a drill may be achieved by utilizing a known principle: minimizing a tangent angle, near the chisel edge, formed between a tangent to a cutting edge and an axis of rotation of the drill. Many different approaches have been taken in order to achieve optimal drill point geometry. The design of the cutting edges in general and near the chisel edge in particular is usually a tradeoff between toughness of the drill point and the ability to penetrate the workpiece efficiently. Drills having a generally sharper drill point design will generally penetrate the workpiece more easily but in most cases that may be at the expense of a more fragile drill point. A more robust, wider design of the drill point will make it sturdier but it may be more difficult for the drill point to pierce the workpiece and center the drill. An important aspect, dependant of drill point and cutting edge geometry is the power required to operate the drilling machine, more specifically, the axial power required to overcome the axial stress on the drill while machining.

SUMMARY OF THE INVENTION

According to the present invention, there is provided a twist drill having a rotation axis A defining a forward to rear direction, the twist drill comprising a cutting portion and a drill body. The cutting portion comprises a chisel edge, a segment relief surface, a chamfer relief surface and at least two flutes extending longitudinally to the drill body. Each flute comprises a rake surface and a gash extending away from the chisel edge. The cutting portion further comprises at least two cutting segments, each cutting segment comprising a main cutting edge which includes a first cutting edge, a second cutting edge and a chamfer cutting edge. The gash and the segment relief surface meet at the first cutting edge. The rake surface and the segment relief surface meet at the second cutting edge and the rake surface and the chamfer relief surface meet at the chamfer cutting edge. The first and second cutting edges are curved and the chamfer edge is straight.

According to embodiments of the present invention, when proceeding along the axis of rotation A in a direction away from the chisel edge, each point of the main cutting edge projected on the axis of rotation A, is located farther from the chisel edge than the point before it.

According to embodiments of the present invention, when proceeding along the main cutting edge in a direction away from the axis of rotation A, each point on the main cutting edge is located farther from the axis of rotation A than the point before it.

According to embodiments of the present invention, the segment relief surface has a concave shape defined by a relief radius $R_R$.

According to embodiments of the present invention, the drill body has a diameter D and the ratio of the relief radius $R_R$ to the diameter D is in the range of 50% to 150%.

According to embodiments of the present invention, the gash has first and second gash surfaces. The first gash surface meets the segment relief surface at the first cutting edge.

According to embodiments of the present invention, the first and second gash surfaces form an angle β therebetween. The angle β is in the range of 60° to 105° and preferably is about 82°.

According to embodiments of the present invention, the first and second gash surfaces meet at a line L. The line L forming an angle γ in the range of 20° to 50° and preferably is about 32° with an axis of rotation A.

According to embodiments of the present invention, relative to the chisel edge, any given point on the main cutting edge is both rearward, and radially outward, of all preceding points on that main cutting edge.

BRIEF DESCRIPTION OF THE DRAWINGS

For a better understanding of the present invention and to show how the same may be carried out in practice, reference will now be made to the accompanying drawings, in which.

Figure 1:
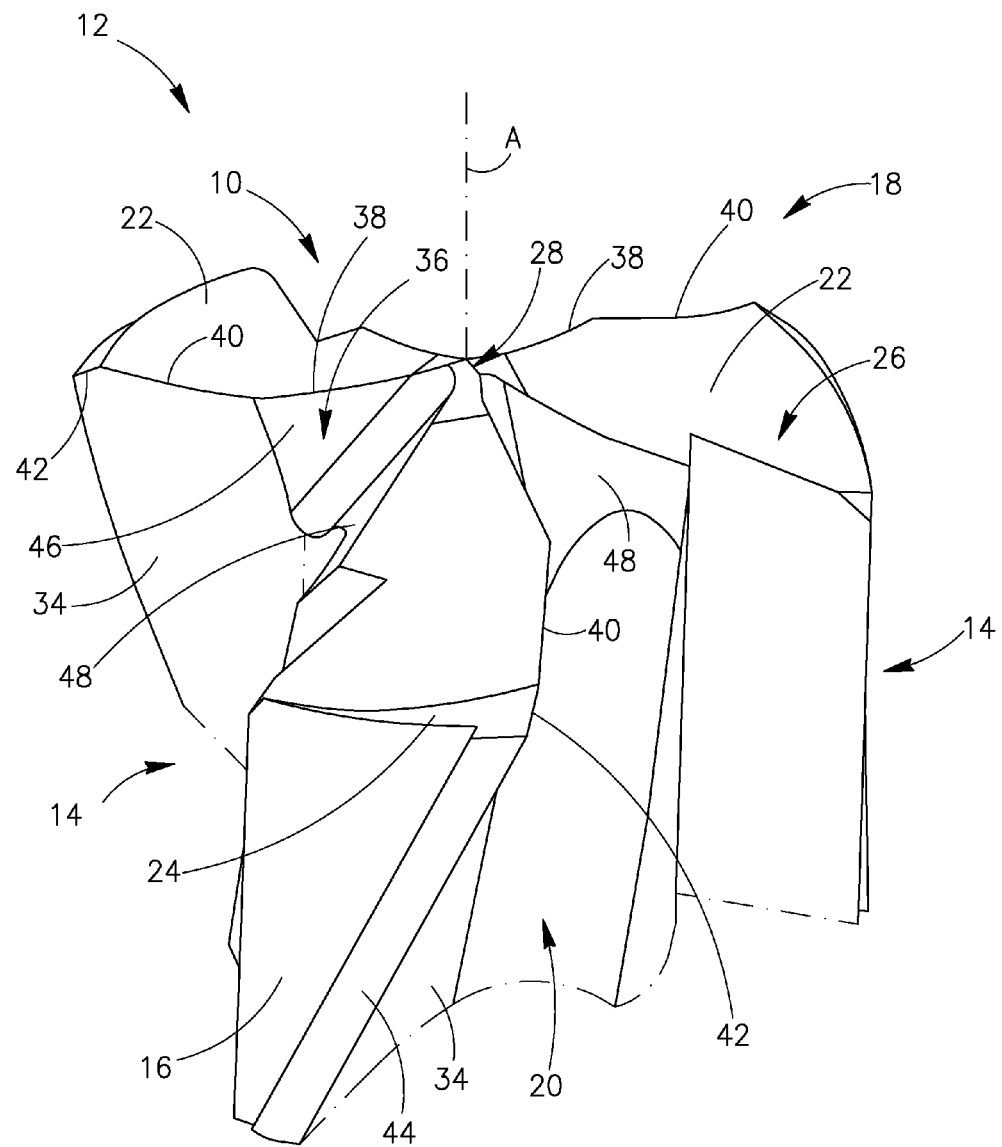
FIG. 1 is a partial isometric view of a twist drill according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Reference is made to the figures in general and specifically to FIG. 1, showing a partial isometric view of a cutting portion 10 at a front end of a twist drill 12 having an axis of rotation A and a diameter D, in accordance with embodiments of the invention. The twist drill 12 has a cylindrical drill body 14 and has a peripheral surface 16. The cutting portion 10 may be part of a one-piece drill or a part of a replaceable cutting head and may be comprised of solid carbide. In accordance with some embodiments, the cutting portion 10 has three identical cutting segments 18 and three identical flutes 20. The cutting segments 18 and flutes 20 are equally spaced circumferentially about the axis of rotation A. The axis of rotation A thus defines a forward-to-rear direction of the drill body 14, with the cutting portion 10 being at the forward end. Each flute 20 may have a helical or straight form and extends longitudinally along the drill body 14. In accordance with other embodiments the number of cutting segments 18 and flutes 20 may be different from three, for example, may be two, or four, or some other number.

Each cutting segment 18 has a segment relief surface 22, which extends radially outwardly, away from the axis of rotation A to a chamfer relief surface 24. The chamfer relief surface 24 extends outwardly to the peripheral surface 16. The segment relief surface 22 and the chamfer relief surface 24 form a main relief surface 26. At the front end of the twist drill 12 is located a chisel edge 28 which is defined by three chisel sub-edges 30. Each chisel sub-edge 30 is formed by intersection of two adjacent segment relief surfaces 22. The flute 20 meets the main relief surface 26 at a main cutting edge 32, also known as a lip. Each flute 20 has a rake surface 34 and a gash 36 formed at the front end of the flute 20.

The main cutting edge 32 is formed of three component cutting edges: a first cutting edge 38, a second cutting edge 40 and a chamfer cutting edge 42. The first cutting edge 38 is formed at an interface of the gash 36 and the segment relief surface 22. The second cutting edge 40 is formed at an interface of the rake surface 34 and the segment relief surface 22. The chamfer cutting edge 42 is formed at an interface of the rake surface 34 and the chamfer relief surface 24. The rake surface 34 extends to the peripheral surface 16 which may have a support wiper 44 which projects from the peripheral surface 16.

Figure 2:
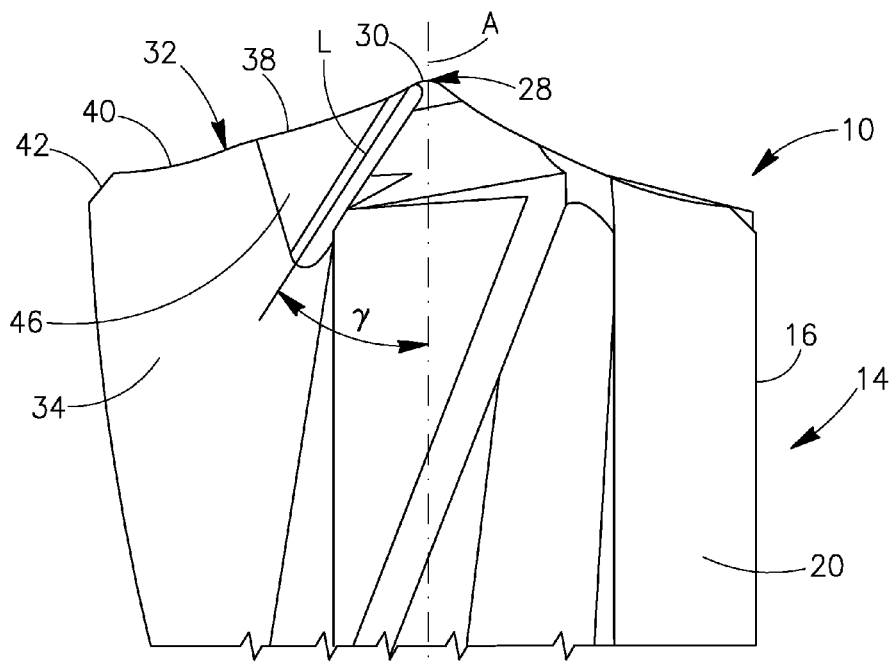
FIG. 2 is a side view of the twist drill shown in FIG. 1.
Figure 3:
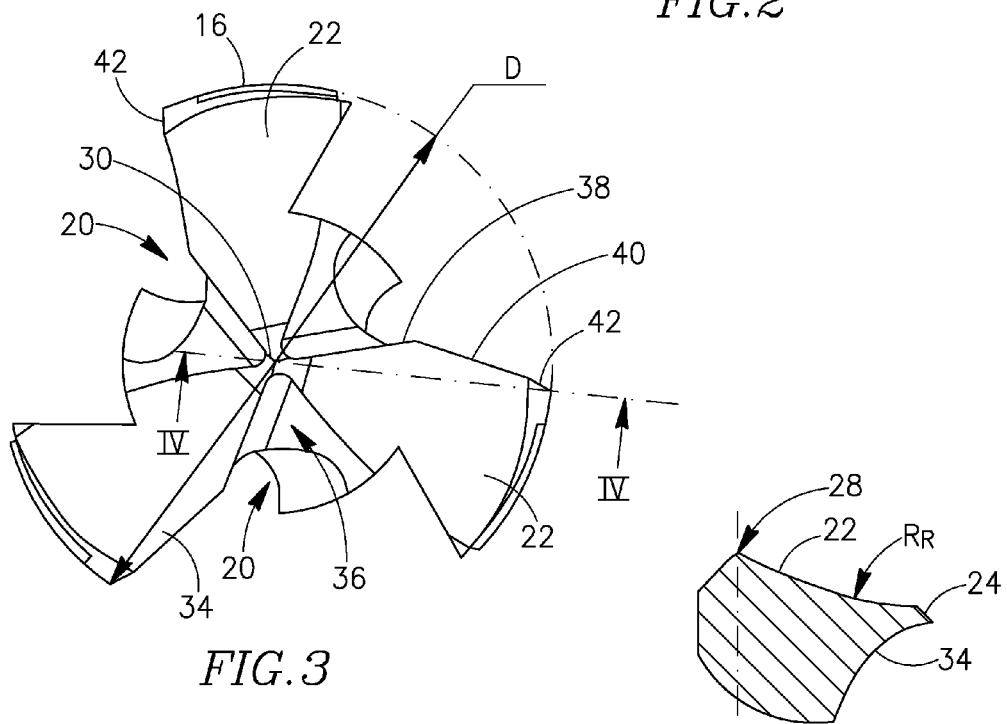
FIG. 3 is an end view of the twist drill shown in FIG. 1.

The first and second cutting edges 38, 40 are both curved. Although in FIG. 3 it may appear that the first cutting edge 38 is straight, it only appears to be straight because in the embodiment shown it has a very large radius of curvature. As can be seen in FIG. 2 both the first and second cutting edges 38, 40 are also concavely curved in a side view. In accordance with some embodiments the first and second cutting edges 38, 40 are non-identical. The curved nature of the first and second cutting edges 38, 40 gives unexpected remarkable drilling results, in terms of centering and lowering machine power requirements.

Figure 4:
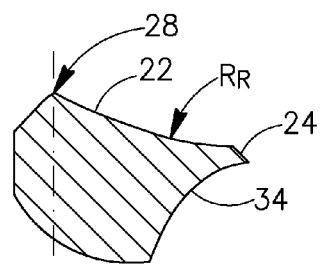
FIG. 4 is a cross section taken along the line IV-IV of FIG. 3.
Figure 5:
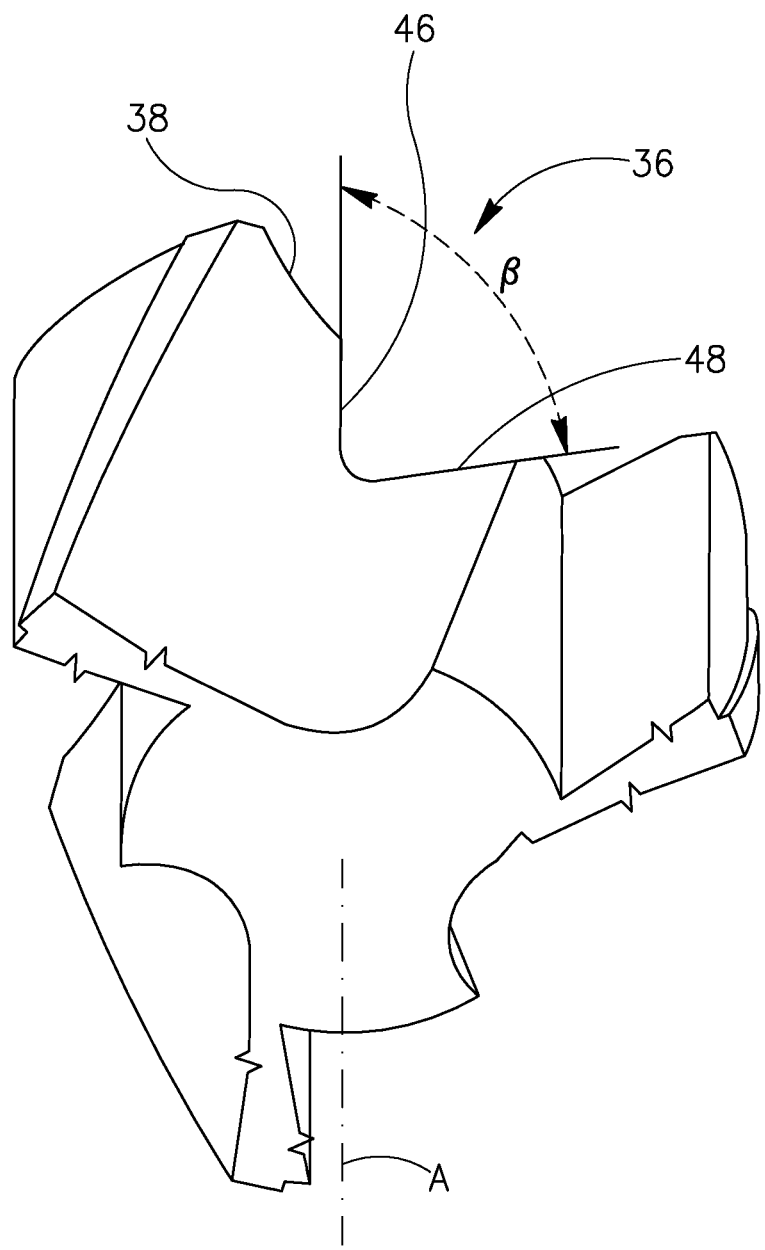
FIG. 5 is a partial bottom isometric view of a twist drill according to embodiments of the present invention.

The segment relief surface 22 has a concave shape. In accordance with some embodiments, the concave shape is part of a sphere defined by a relief radius $R_R$ (see FIG. 4). The ratio of the relief radius $R_R$ to the diameter D is in the range of 50% to 150%. The gash 36 has first and second gash surfaces 46, 48. According to some embodiments, the first gash surface 46 is planar. The first gash surface 46 meets the segment relief surface 22 at the first cutting edge 38. The first and second gash surfaces 46, 48 form an angle β therebetween (see FIG. 5). The first and second gash surfaces 46, 48 meet at a line L which forms an angle γ with the axis of rotation A. In accordance with some embodiments, the angle β may be in the range of 60° to 105° and preferably is 82°±5°. Independently, the angle γ may be in the range of 20° to 50° and preferably is 32°±3°.

When proceeding along the axis of rotation A in a direction away from the chisel edge 28, each point of the main cutting edge 32 projected on the axis of rotation A, is located farther from the chisel edge 28 than the point before it. Thus, relative to the chisel edge 28, any given point on the main cutting edge 32 is rearward of all preceding points on that main cutting edge 32. Furthermore, when proceeding along the main cutting edge 32 in a direction away from the chisel edge 28, each point on the main cutting edge 32 is located farther from the axis of rotation A than the point before it. Thus, relative to the chisel edge 28, any given point on the main cutting edge 32 is radially outward of all preceding points on that main cutting edge 32.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A twist drill having an axis of rotation A defining a forward to rear direction, the twist drill comprising a cutting portion and a drill body, the cutting portion comprising:
   a chisel edge;
   at least two flutes extending longitudinally to the drill body, each flute comprising a rake surface and a gash extending away from the chisel edge;
   at least two cutting segments, each cutting segment comprising:
   a main cutting edge which comprises a first cutting edge extending away from the chisel edge, a second cutting edge connected to the first cutting edge and a chamfer cutting edge connected to the second cutting edge;
   a segment relief surface; and
   a chamfer relief surface;
   wherein:
   the gash and the segment relief surface meet at the first cutting edge;
   the rake surface and the segment relief surface meet at the second cutting edge;
   the rake surface and the chamfer relief surface meet at the chamfer cutting edge;
   the first and second cutting edges are curved and the chamfer edge is straight; and
   the first and second cutting edges are concavely curved in the same side view.

2. The twist drill according to claim 1, wherein when proceeding along the axis of rotation A in a direction away from the chisel edge, each point of the main cutting edge projected on the axis of rotation A, is located farther from the chisel edge than the point before it.

3. The twist drill according to claim 1, wherein when proceeding along the main cutting edge in a direction away from the chisel edge, each point on the main cutting edge is located farther from the axis of rotation A than the point before it.

4. The twist drill according to claim 1, wherein the segment relief surface has a concave shape defined by a relief radius $R_R$.

5. The twist drill according to claim 4, wherein the drill body has a diameter D, and wherein $0.5 < R_R/D < 1.5$.

6. The twist drill according to claim 1, wherein the gash has first and second gash surfaces, the first gash surface meets the segment relief surface at the first cutting edge.

7. The twist drill according to claim 6, wherein the first and second gash surfaces form an angle β therebetween, the angle β being in the range of 60° to 105°.

8. The twist drill according to claim 7, wherein the angle β is about 82°.

9. The twist drill according to claim 6, wherein the first and second gash surfaces meet at a line L, the line L forming an angle γ in the range of 20° to 50° with an axis of rotation A.

10. The twist drill according to claim 9, wherein the angle γ is about 32°.

11. The twist drill according to claim 1, wherein:
   when proceeding along the axis of rotation A in a direction away from the chisel edge, each point of the main cutting edge projected on the axis of rotation A, is located farther from the chisel edge than the point before it; and
   when proceeding along the main cutting edge in a direction away from the chisel edge, each point on the main cutting edge is located farther from the axis of rotation A than the point before it.

12. The twist drill according to claim 1, wherein:
relative to the chisel edge, any given point on the main cutting edge is both rearward, and radially outward, of all preceding points on that main cutting edge.

13. A twist drill having an axis of rotation A defining a forward to rear direction, the twist drill comprising a cutting portion and a drill body, the cutting portion comprising:
   a chisel edge;
   at least two flutes extending longitudinally to the drill body, each flute comprising a rake surface and a gash extending away from the chisel edge;
   at least two cutting segments, each cutting segment comprising:
   a main cutting edge which comprises a first cutting edge extending away from the chisel edge, a second cutting edge connected to the first cutting edge and a chamfer cutting edge connected to the second cutting edge;
   a segment relief surface; and
   a chamfer relief surface;
      wherein:
   the gash and the segment relief surface meet at the first cutting edge;
   the rake surface and the segment relief surface meet at the second cutting edge;
   the rake surface and the chamfer relief surface meet at the chamfer cutting edge;
   the first and second cutting edges are curved and the chamfer edge is straight;
   the segment relief surface has a concave shape defined by a relief radius $R_R$; and
   the drill body has a diameter D, and wherein $0.5 < R_R/D < 1.5$.

14. A twist drill having an axis of rotation A defining a forward to rear direction, the twist drill comprising a cutting portion and a drill body, the cutting portion comprising:
   a chisel edge;
   at least two flutes extending longitudinally to the drill body, each flute comprising a rake surface and a gash extending away from the chisel edge;
   at least two cutting segments, each cutting segment comprising:
   a main cutting edge which comprises a first cutting edge extending away from the chisel edge, a second cutting edge connected to the first cutting edge and a chamfer cutting edge connected to the second cutting edge;
   a segment relief surface; and
   a chamfer relief surface;
      wherein:
   the gash and the segment relief surface meet at the first cutting edge;
   the rake surface and the segment relief surface meet at the second cutting edge;
   the rake surface and the chamfer relief surface meet at the chamfer cutting edge;
   the first and second cutting edges are curved and the chamfer edge is straight;
   the gash has first and second gash surfaces, the first gash surface meets the segment relief surface at the first cutting edge; and
   the first and second gash surfaces form an angle $\beta$ therebetween, the angle $\beta$ being in the range of 60° to 105°.

15. The twist drill according to claim 14, wherein the angle $\beta$ is about 82°.

16. The twist drill according to claim 14, wherein the first and second gash surfaces meet at a line L, the line L forming an angle $\gamma$ in the range of 20° to 50° with an axis of rotation A.

17. The twist drill according to claim 16, wherein the angle $\gamma$ is about 32°;
   the segment relief surface has a concave shape defined by a relief radius $R_R$; and
   the drill body has a diameter D, and wherein $0.5 < R_R/D < 1.5$.

* * * * *